US010443732B2

(12) United States Patent
Clark et al.

(10) Patent No.: US 10,443,732 B2
(45) Date of Patent: Oct. 15, 2019

(54) OIL SLINGER WITH CONVECTIVE COOLING OF RADIAL SURFACE

(71) Applicant: United Technologies Corporation, Hartford, CT (US)

(72) Inventors: Thomas E. Clark, Sanford, ME (US); Eric Charles Mundell, South Berwick, ME (US); Gary L. Grogg, South Berwick, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 619 days.

(21) Appl. No.: 15/075,955

(22) Filed: Mar. 21, 2016

(65) Prior Publication Data
US 2016/0238135 A1    Aug. 18, 2016

Related U.S. Application Data

(63) Continuation of application No. PCT/US2014/059667, filed on Oct. 8, 2014.

(60) Provisional application No. 61/915,824, filed on Dec. 13, 2013.

(51) Int. Cl.
| F16J 15/16 | (2006.01) |
| F01D 25/18 | (2006.01) |
| F02C 7/06 | (2006.01) |
| F01D 25/12 | (2006.01) |

(52) U.S. Cl.
CPC ............ *F16J 15/168* (2013.01); *F01D 25/12* (2013.01); *F01D 25/18* (2013.01); *F01D 25/183* (2013.01); *F02C 7/06* (2013.01); *F05D 2220/323* (2013.01); *F05D 2230/60* (2013.01); *F05D 2240/55* (2013.01); *F05D 2260/20* (2013.01); *Y02T 50/672* (2013.01)

(58) Field of Classification Search
CPC ...... F01D 25/18; F01D 25/183; F01D 25/186; F01D 9/065; F05D 2260/98; F16J 15/168
See application file for complete search history.

(56) References Cited

U.S. PATENT DOCUMENTS

| 4,542,623 A | 9/1985 | Hovan et al. |
| 4,683,714 A | 8/1987 | Thebert |
| 4,709,545 A | 12/1987 | Stevens et al. |
| (Continued) | | |

OTHER PUBLICATIONS

International Search Report and Written Opinion dated Jun. 4, 2015 in Application No. PCT/US2014/059667.
(Continued)

*Primary Examiner* — Kristina R Fulton
*Assistant Examiner* — L. Susmitha Koneru
(74) *Attorney, Agent, or Firm* — Snell & Wilmer L.L.P.

(57) ABSTRACT

Oil slinger systems include a seal runner comprising an annular radial member having a radius (R) and an outer axially extending member having an axial length (L) such that a ratio (L/R) is between 0.8 and 1.4, the annular radial member disposed at a first angle with respect to the outer axially extending member, a heat shield in mechanical communication with the seal runner, and a volume bounded by an outer face of the annular radial member and an inner face of the heat shield. Methods of radial convective cooling include pumping a cooling liquid through the oil slinger system and convectively cooling the oil slinger.

19 Claims, 6 Drawing Sheets

(56) References Cited

U.S. PATENT DOCUMENTS

| | | | | |
|---|---|---|---|---|
| 5,039,113 | A * | 8/1991 | Gardner | F16J 15/3412 |
| | | | | 277/348 |
| 5,804,228 | A * | 9/1998 | Kofsman | B29C 45/278 |
| | | | | 264/328.15 |
| 8,678,741 | B2 * | 3/2014 | Olennikov | F01D 11/003 |
| | | | | 415/1 |
| 2007/0025835 | A1 | 2/2007 | Gockel et al. | |
| 2008/0072599 | A1 | 3/2008 | Morenko et al. | |
| 2011/0304101 | A1 * | 12/2011 | Grondahl | F01D 11/02 |
| | | | | 277/411 |
| 2012/0027569 | A1 | 2/2012 | Purdey | |
| 2014/0369832 | A1 * | 12/2014 | Blais | F01D 11/00 |
| | | | | 415/230 |
| 2016/0238075 | A1 * | 8/2016 | Clark | F16C 33/6677 |
| 2016/0238137 | A1 * | 8/2016 | Clark | F01D 25/162 |

OTHER PUBLICATIONS

International Preliminary Report on Patentability dated Jun. 14, 2016 in Application No. PCT/US2014/059667.

* cited by examiner

OIL SLINGER WITH CONVECTIVE COOLING OF RADIAL SURFACE

CROSS-REFERENCE TO RELATED APPLICATIONS

This application is a continuation of, claims priority to and the benefit of, PCT/US2014/059667 filed on Oct. 8, 2014 and entitled "OIL SLINGER WITH CONVECTIVE COOLING OF RADIAL SURFACE," which claims priority from U.S. Provisional Application No. 61/915,824 filed on Dec. 13, 2013 and entitled "OIL SLINGER WITH CONVECTIVE COOLING OF RADIAL SURFACE." Both of the aforementioned applications are incorporated herein by reference in their entirety.

STATEMENT REGARDING GOVERNMENT RIGHTS

These inventions were made with government support under FA8650-09-D-2923-AETD awarded by the United States Air Force. The government has certain rights in these inventions.

FIELD

The present disclosure relates to oil slingers, methods of assembling oil slinger systems, and methods of radial centrifugal cooling.

BACKGROUND

Oil slingers may be used to disperse cooling liquid in various engine compartments to lubricate and cool various engine components. Oil slingers can be a separable unit which affixes to a rotating member, such as the shaft of a gas turbine engine. Current oil slingers can comprise seal runners with low radial length to axial length aspect ratios to enhance stability and perform axial cooling, but current seal runners occupy significant axial space.

SUMMARY

In various embodiments, oil slinger systems include a seal runner comprising an annular radial member having a radius (R) and an outer axially extending member having an axial length (L) such that a ratio (L/R) is between 0.8 and 1.4, the annular radial member disposed at a first angle with respect to the outer axially extending member, a heat shield in mechanical communication with the seal runner, and a volume bounded by an outer face of the annular radial member and an inner face of the heat shield are disclosed.

According to various embodiments, methods of assembling oil slinger systems comprise disposing a heat shield in mechanical communication with a seal runner, wherein the seal runner comprises an annular radial member having a radius (R) and an outer axially extending member having an axial length (L) such that a ratio (L/R) is between 0.8 and 1.4, the annular radial member disposed at a first angle with respect to the outer axially extending member, pressing the seal runner onto a shaft, and forming a volume bounded by an outer face of the annular radial member and an inner face of the heat shield.

In various embodiments, methods of radial convective cooling comprise pumping a cooling liquid through an oil slinger system, and convectively cooling the oil slinger, wherein the oil slinger comprises a seal runner comprising an annular radial member having a radius (R) and an outer axially extending member having an axial length (L) such that a ratio (L/R) is between 0.8 and 1.4, the annular radial member disposed at a first angle with respect to the outer axially extending member, a heat shield in mechanical communication with the seal runner, and a volume bounded by an outer face of the annular radial member and an inner face of the heat shield.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
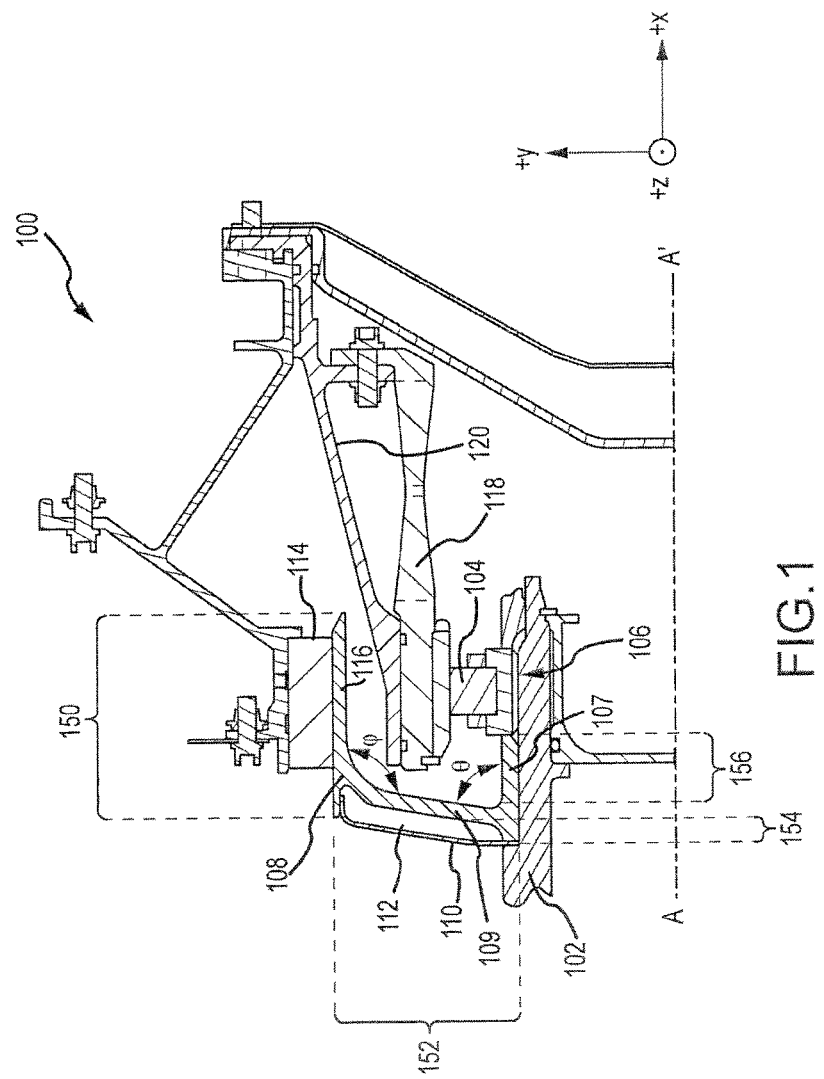
FIG. 1 illustrates various aspects of a rotating system comprising an oil slinger system according to various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. Different cross-hatching is used throughout the figures to denote different parts but not necessarily to denote the same or different materials.

As used herein, "aft" refers to the direction associated with the tail (e.g., the back end) of an aircraft, or generally, to the direction of exhaust of the gas turbine. For example, with brief reference to FIG. 1, with regard to central axis A-A', point A' may be described as being aft of point A.

As used herein, "forward" refers to the directed associated with the nose (e.g., the front end) of an aircraft, or generally, to the direction of flight or motion. For example, with brief reference to FIG. 1, central axis A-A' may be described as extending from a forward position (A) to an aft position (A').

As used herein, the term "radially outward" may refer to a point that is further away from a central axis than another reference point along a radius of the central axis. For example, with brief reference to FIG. 1, outer axially extending member 116 may be described as radially outward of inner axially extending member 107 because outer axially extending member 116 is further from central axis A-A' than inner axially extending member 107 along a radius of central axis A-A'.

As used herein, the term "radially inward" may refer to a point that is closer to a central axis than another reference point along a radius of the central axis. For example, with brief reference to FIG. 1, inner axially extending member 107 may be described as radially inward of outer axially extending member 116 because inner axially extending member 107 is closer to central axis A-A' than outer axially extending member 116 along a radius of central axis A-A'.

As used herein, the term "oil slinger" may include any device which contacts a cooling liquid, as described herein. The term "oil slinger" also includes multi-directional oil slingers and/or oil slingers which utilize radially concave geometry (with respect to a centerline) to induce axial and radial cooling liquid flow. Various embodiments may utilize induced centrifugal load from a turbine shaft to provide work to impel the cooling liquid onto an interior wall of an oil slinger and pump the cooling liquid radially outward, among other directions. The slung cooling liquid may provide various functions, such as lubrication and cooling. For example, in aerospace applications, multi-directional oil slingers may provide a bearing compartment with the ability to simultaneously cool compartment metal temperatures and provide seal cooling in an oxidation environment.

As used herein, the term "cooling liquid" may include a liquid capable of convective heat transfer and/or a liquid capable of providing lubrication. For example, a cooling liquid may be a lubricating oil, a coolant, or a combination of lubricating oil and a coolant. The cooling liquid is not particularly limited and may include, in various embodiments, synthetic-based oil, petroleum-based oil, or combinations thereof.

In various embodiments, it has been found that increasing the ratio of radial length to axial length of a seal runner to, for example, 1 or very near 1, improves the flow of cooling liquid across a radial surface of the seal runner. The improvement of flow is due to increased residence time of a cooling liquid on the radial surface. Stated another way, a cooling liquid remains in contact with the radial surface of the seal runner for a longer period of time than conventionally possible, thus allowing the cooling liquid to absorb a greater quantity of heat from the radial surface. Accordingly, such a seal runner may allow for more heat to be convectively removed from a seal runner per unit time.

With reference to FIG. 1, a rotating system 100 may comprise a seal runner 108, a rotating shaft 102, and a heat shield 110. Seal runner 108 may comprise an annular radial member 109 having a radius ("R") 152 and an outer axially extending member 116 having an axial length ("L") 150. Annular radial member 109 may be disposed at a first angle ("φ") with respect to outer axially extending member 116.

In various embodiments, the ratio of axial length (L) 150 and the radius (R) 152 is such that (L/R) is not substantially less than or greater than 1. For example, in various embodiments, the ratio (L/R) may be between 0.8 and 1.4, between 0.83 and 1.1, 0.9 and 0.99, and/or approximately 1. In this regard, the seal runner 108 may have significantly greater radial length than conventional, low radial length to axial length ratio seal runners, which may permit rotating system 100 to provide radial convective cooling in addition to axial convective cooling.

In various embodiments, the surface of outer axially extending member 116 may be adapted to interface with a seal assembly 114. In this regard, cooling liquid conveyed to bearing 104 may be sealed from other areas, for example, areas of an engine where the cooling liquid could combust or otherwise degrade. In various embodiments, rotating system 100 may also comprise a bearing support member 120 and a bearing centering spring 118. A bearing centering spring 118 may extend in the forward direction (negative X direction) beneath the outer axially extending member 116 of seal runner 108, and may interface with bearing 104 and bearing support member 120. Bearing centering spring 118 may exert a centering force on bearing 104 to prevent unwanted wobble (e.g., unwanted radial movement) of bearing 104 or other movement of rotating shaft 102.

Heat shield 110 may be connected to seal runner 108, such that there is a volume 112, which may be a volume bound by an outer face of the annular radial member and an inner face of the heat shield. The term "outer face" may include a forward face as used herein. The term "inner face" may include an aft face as used herein. For example, volume 112 may occupy the void defined by axial separation ("D") 154 (exemplified in FIG. 1 along the X direction) of the forward face of seal runner 108 and aft face of heat shield 110. The term connected may include being held into place with friction. In various embodiments, heat shield 110 may be connected to seal runner 108. According to various embodiments, heat shield 110 may terminate on or below outer axially extending member 116. Thus, in various embodiments, heat shield 110 may terminate radially inward of outer axially extending member 116. For example, in various embodiments the outer axially extending member 116 may extend axially beyond the annular radial member 109 in a forward direction, providing a shoulder to secure heat shield 110. In various embodiments, rotating shaft 102 may be configured to help secure heat shield 110.

The size of volume 112 and length of D 154 is not particularly limited and may be varied to alter the thermal protection properties of the seal runner. In various embodiments, the ratio of the distance (D) between the heat shield and the radial member of the seal runner and radius 152 (R) may vary such that (D/R) is between about 0.02 and 0.20, between about 0.03 and 0.15, and about 0.05 and about 0.08.

In various embodiments, seal runner 108 may also comprise an inner axially extending member 107 having an axial length ("I") 156. Axial length (I) is not particularly limited and in various embodiments, axial length (L) 150 can be greater than axial length (I) 156. In various embodiments axial length (L) 150 can be equal to axial length (I) 156. According to various embodiments, inner axially extending member 107 can be disposed at a second angle ("θ") with respect to the annular radial member 109. Second angle θ is not particularly limited and in various embodiments may be between about 75 degrees and about 90 degrees, between about 83 degrees and about 87 degrees, or may be 90 degrees.

In various embodiments, rotating system 100 may comprise rotating shaft 102 which is in mechanical communication with seal runner 108. Rotating shaft 102 may, in various embodiments, comprise part of a turbine system, such as in a gas turbine engine. In various embodiments, liquid passageway 106 may be disposed between rotating shaft 102 and seal runner 108, to permit cooling liquid to flow under and/or radially outward through inner axially extending member 107.

Figure 2:
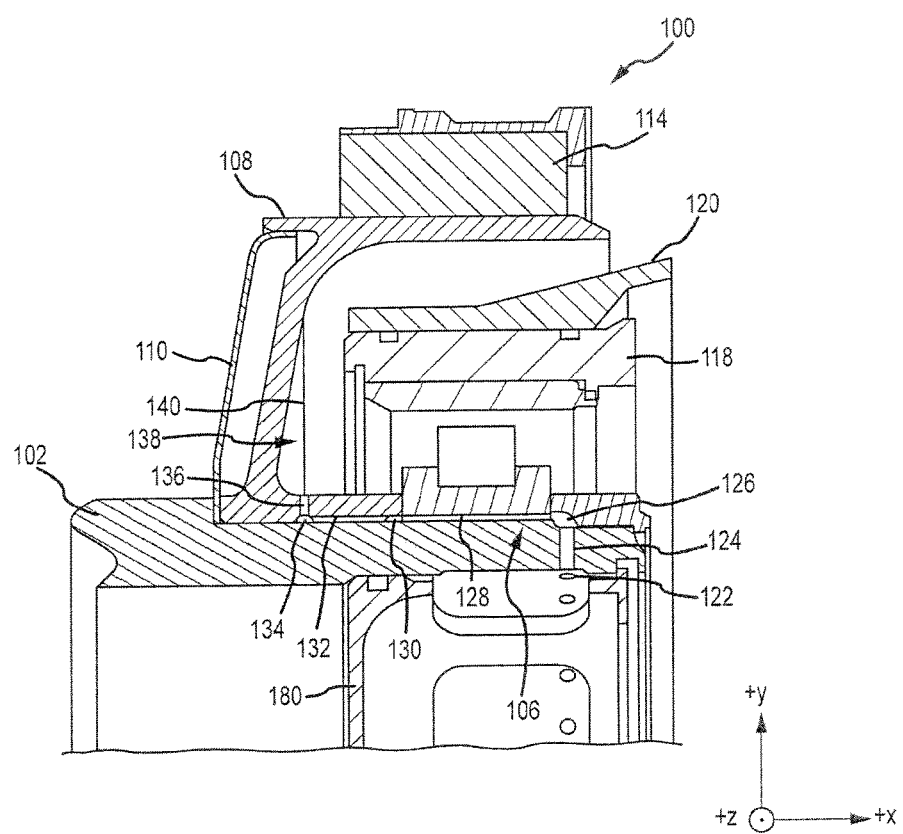
FIG. 2 illustrates various aspects of a rotating system comprising an oil slinger system according to various embodiments.

With reference to FIG. 2, lower oil passageway 106 is illustrated. In various embodiments, oil plug 180 may be configured with orifice 122 and may be in fluid communication with inboard passageway 124 extending radially outward through rotating shaft 102. Inboard passageway 124 may be in fluid communication with bearing nut passageway 126, which may extend circumferentially around rotating shaft 102. Bearing nut passageway 126 may be in fluid communication with bearing inner race passageway 128 extending in the axial direction. In various embodiments, bearing inner race passageway 128 may be angled by less than 15 degrees, which in various embodiments, may increase the cooling liquid flow rate. In various embodiments, bearing inner race passageway 128 may comprise a straight bore, which may be configured to be filled axially with a cooling liquid.

Bearing inner race passageway 128 may be in fluid communication with snap passageway 130, which may extend circumferentially around rotating shaft 102. Snap passageway 130 may be in fluid communication with lower oil passage 132, which may be configured to receive a cooling liquid, and into circumferential seal runner passageway 134. Circumferential seal runner passageway may be in fluid communication with radial oil passage 136, which may be configured to permit a cooling liquid to pass from the lower oil passage 132 and through inner axially extending member 107 (exemplified in FIG. 1) to an inner face of the annular radial member 138 of seal runner 108.

Seal runner 108 may comprise an inner face of the annular radial member 138. In various embodiments the inner face of the annular radial member 138 of seal runner 108 may be smooth. In various embodiments, inner face of the annular radial member 138 of seal runner 108 may comprise rib 140. In various embodiments, rib 140 may extend in the radial direction. In various embodiments, the inner face of the annular radial member 138 of seal runner 108 may comprise at least one of a rib and a groove. In various embodiments, the ribs and groves may extend radially. In various embodiments, the ribs and groves may travel circumferentially on inner face of the annular radial member 138. Without being limited to any theory, it is believed that the addition of at least one of a rib and a grove to inner face of the annular radial member 138 of seal runner 108 may help to increase residence time and increase the surface area of inner face of the annular radial member 138, thus permitting increased heat transfer from seal runner 108 to a cooling liquid. Furthermore, it is also believed that in various embodiments, the addition of ribs may conductively transfer heat aft, where it can be convectively transferred to the cooling liquid.

Now, having described the various components of oil slinger systems according to various embodiments, rotating system 100 may be used to perform convective cooling, for example, in a gas turbine engine. Accordingly, in various embodiments, a cooling system may comprise a cooling liquid and an oil slinger system.

Figure 5:
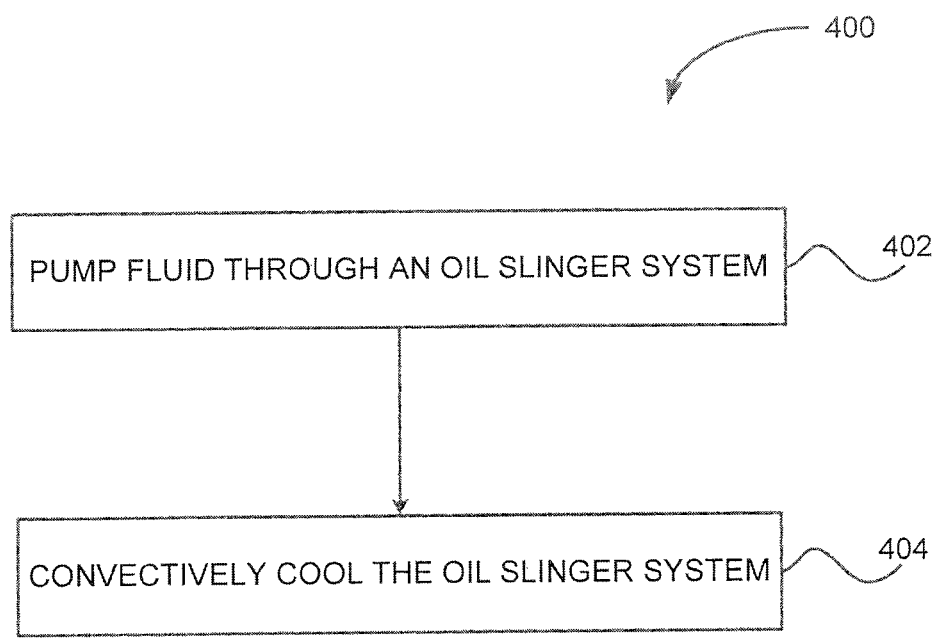
FIG. 5 illustrates various radial convective cooling methods according to various embodiments.

With temporary reference to FIG. 5, FIG. 5 illustrates method 400 of radial convective cooling according to various embodiments. According to various embodiments, methods for convective cooling may comprise pumping a cooling liquid through oil slinger system (step 402) and convectively cooling the oil slinger (step 404). For example, in various embodiments, cooling liquid may be pumped through rotating system 100 to convectively cool rotating system 100.

Figure 3:
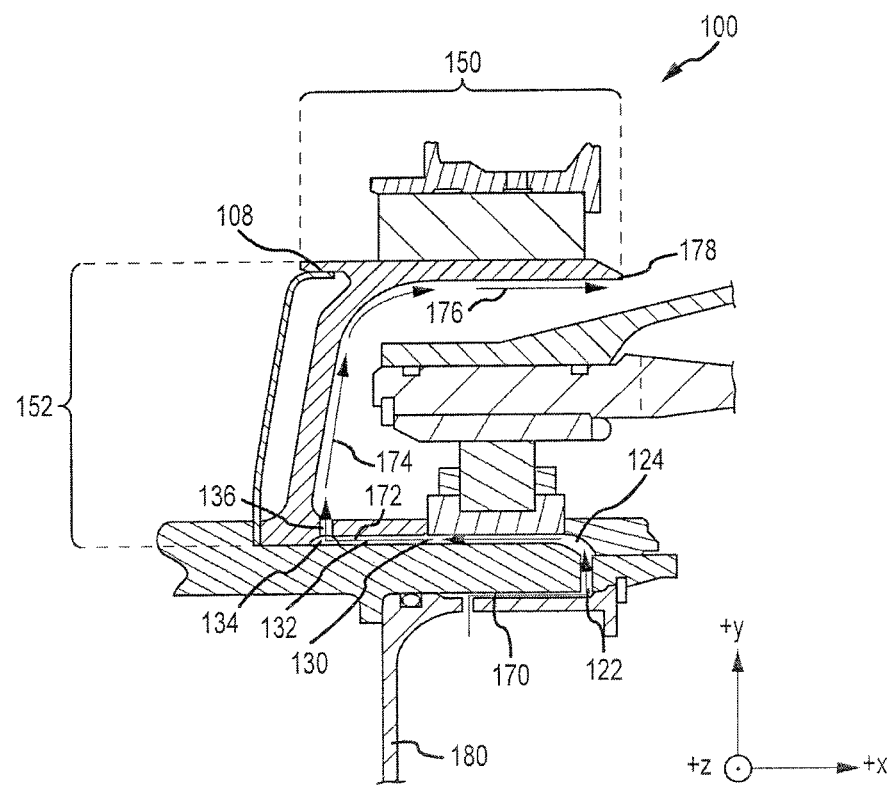
FIG. 3 illustrates various aspects of a rotating system comprising an oil slinger system and cooling liquid flow path according to various embodiments.

With reference to FIG. 3, the cooling liquid flow path for radial convective cooling according to various embodiments is shown. An oil jet (not shown) may spray cooling liquid into oil plug 180. Rotation of shaft 102 imparts a centrifugal force on cooling liquid sprayed from the oil jet (not shown), moving the cooling liquid through orifice 122 of oil plug 180 and through the rotating shaft into bearing nut passageway 126 (liquid flow path 170). In various embodiments, the cooling liquid may travel circumferentially and then may travel axially forward to the snap passageway 130. The cooling liquid may then flow axially forward as cooling liquid flow path 172 and through inner axially extending member 107 of seal runner 108. After contacting the inner face of the annular radial member 138 of seal runner 108, the cooling liquid is driven by centrifugal force in the radially outward direction along the inner face (flow path 174). According to various embodiments, the radial progression of the cooling liquid may perform convective radial cooling to help areas aft of seal runner 108, such as a bearing 104 (shown in FIG. 1) sufficiently cool. For example, in various embodiments, radial convectively cooling a bearing compartment on a gas turbine engine can keep compartment temperatures below about 450° F. (about 232° C.), or below about 400° F. (about 204° C.), below about 375° F. (about 191° C.) or below about 350° F. (about 177° C.). Without being limited to any theory, it is believed that the increased radial surface relative to conventional technologies may increase the residence time of a cooling liquid, permitting an internal compartment to be more axially compact while maintaining sufficient cooling and internal compartment temperatures.

Figure 4:
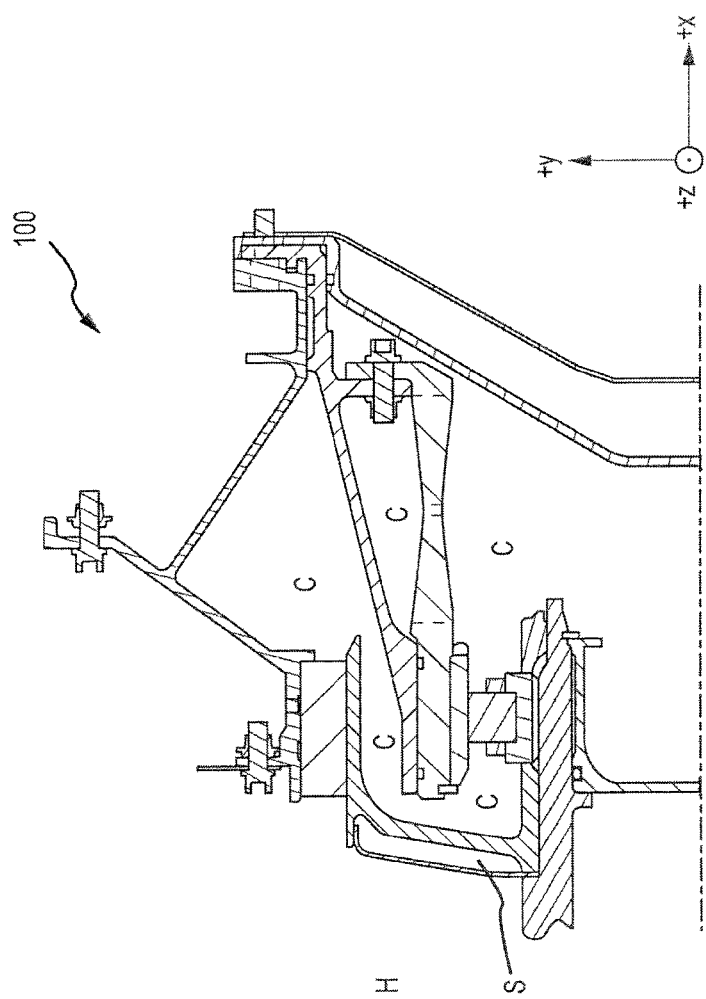
FIG. 4 illustrates various temperature zones of a rotating system comprising an oil slinger system according to various embodiments.

For example, with temporary reference to FIG. 4, various temperature zones in rotating system 100 are exemplified. In rotating system 100, such as that of a gas turbine engine, a heat gradient may exist axially across rotating system 100 (e.g., due to combustion forward of rotating system 100). Accordingly, hot zone H may have a temperature ("TH") which is greater than a temperature of cool zone C ("TC"). A volume bounded by an outer face of the annular radial member and an inner face of the heat shield may create a dead zone S, which may have a temperature ("TS"). According to various embodiments, dead zone S may be created by hermetically sealing volume 112 (shown in FIG. 1). By hermetically sealing volume 112, dead zone S may help to prevent heat transfer from hot zone H to cool zone C and, thus, may have an insulating effect on cool zone C. Accordingly, in various embodiments, due to the insulating effects of dead zone S, TH>TS>TC. For example, in various embodiments, such in that of a gas turbine, TH may be significantly greater than 450° F. (232° C.), while TS may be greater than 450° F. (232° C.), while TC may be less than 450° F. (232° C.). As used in reference to TH, a temperature "significantly greater" may include a temperature that is more than about 50° F. (about 20° C.) than the temperature to which the term "significantly greater" refers.

As used herein, the term "hermetically seal" may include a complete or substantially complete seal or closure. "Hermetically seal" may include airtight or substantially airtight as used herein. The method of hermetically sealing volume 112 (shown in FIG. 1) to create dead zone S is not particularly limited and may include welding, braising, mechanically fastening (clamps, screws, and the like), securing with friction (e.g., snapping, force fit and/or press fit), and any other suitable method of attaching heat shield 110 to seal runner 108.

With reference back to FIG. 3, after contacting the outer axially extending member (shown in FIG. 1 as 116), the cooling liquid may travel axially aft along the surface of seal runner 108 in aft cooling liquid flow direction 176 (exemplified in FIG. 3 along the positive X direction) until reaching a terminal point 178 of seal runner 108, at which point the cooling liquid is expelled aft from the surface of the seal runner to be cooled and/or recirculated. Upon being expelled from terminal point 178, the cooling liquid may mix with aft internal gasses (e.g., air), cool, and be recycled. By consistently pumping cooling liquid through the oil slinger system, internal components located within cool zone C (shown in FIG. 4), such as a bearing, may be protected from hot external gases, such as those present in a gas turbine engine. Thus, the combination of dead zone S and the pumping of a cooling liquid through the oil slinger system may help to protect and cool components located within cool zone C.

Figure 6:
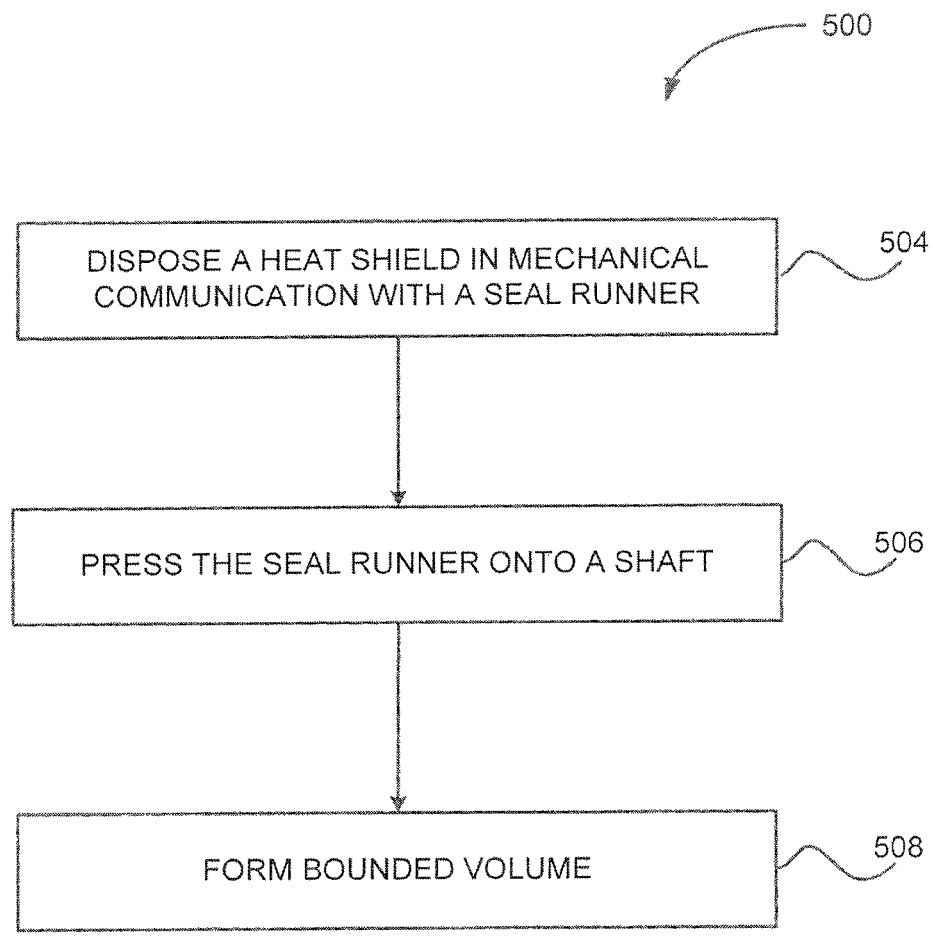
FIG. 6 illustrates various methods of assembling oil slinger systems according to various embodiments.

Having described various components of oil slinger systems and methods of convective cooling with oil slinger system, oil slinger system may be assembled according to various methods, such as method 500 shown in FIG. 6. FIG. 6 illustrates methods of assembling oil slinger systems. Method 500 may comprise disposing a heat shield in mechanical communication with a seal runner (step 504), pressing the seal runner in an axial direction onto a shaft (step 506), and forming a bounded volume (step 508). According to various embodiments, the bounded volume may be formed by an outer face of the annular radial member and an inner face of the heat shield. Thus, in various embodiments, bounded volume may be dead zone S, which may be hermetically sealed (as described above). By hermetically sealing a bounded volume and creating dead zone S, heat transfer may be reduced, as described above.

According to various embodiments, the shaft may be disposed in mechanical communication with a turbine. In various embodiments, the seal runner may comprise an annular radial member having a radius (R) and an outer axially extending member having an axial length (L) such that a ratio (L/R) is between 0.8 and 1.4, the annular radial member disposed at a first angle with respect to the outer axially extending member. In various embodiments, the bounded volume may be a volume bounded by an outer face of the annular radial member and an inner face of the heat shield.

Various components of oil slinger systems may be manufactured from various materials. In various embodiments, various components of oil slinger systems, for example, the seal runner, may comprise at least one of steel, titanium, and alloys thereof. Moreover, in various embodiments, the heat shield may comprise a nickel alloy. However, in further embodiments, various components of oil slinger systems may comprise other metals, such as titanium, tungsten, aluminum, alloys, or stainless steel, though they may further comprise numerous other materials configured to provide mechanical resiliency and/or support of the system when subjected to wear in an operating environment or to satisfy other desired electromagnetic, chemical, physical, or biological properties such as strength, durability, ductility, heat tolerance, thermal dissipation, and footprint constraints, among others. In various embodiments, various portions of oil slinger systems as disclosed herein are made of different materials or combinations of materials, and/or may comprise various coatings.

In various embodiments, a seal assembly may comprise may comprise one or more forms of carbon and/or carbon containing materials such as carbon composites. However, a seal assembly may comprise other materials including ceramics or polymers. Moreover, a seal assembly may comprise multiple materials, or any material configuration suitable to enhance or reinforce the resiliency and/or support of the system when subjected to wear in an operating environment or to satisfy other desired electromagnetic, chemical, physical, or biological properties such as strength, durability, ductility, heat tolerance, thermal dissipation, and footprint constraints, among others.

In various embodiments, the present disclosure provides oil slinger systems with improved radial heat transfer capabilities and improved axial compactness. While cooling rates may be adjusted by various factors (e.g., orifice sizes, fluid velocity, and fluid flow rate), preliminary studies show that oil slinger systems according to the various embodiments disclosed herein may have improved heat transfer capabilities about ten times that of conventional oil slinger systems, even when other cooling factors (e.g., fluid flow rates) are kept constant.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An oil slinger system comprising:
   a seal runner comprising an annular radial member having a radius (R), an inner axially extending member, and an outer axially extending member having an axial length (L) such that a ratio (L/R) of the axial length to the radius is between 0.8 and 1.4, the annular radial member disposed at a first angle with respect to the outer axially extending member and the annular radial member disposed at a second angle with respect to the inner axially extending member;
   a heat shield in mechanical communication with the seal runner; and
   a volume bounded by an outer face of the annular radial member and an inner face of the heat shield;
   wherein the inner axially extending member comprises a radial oil passage positioned at a junction between the inner axially extending member and the annular radial member
   wherein the radial oil passage is configured to permit a lubricating oil to pass through the inner axially extending member to an inner face of the annular radial member, opposite the outer face of the annular radial member, such that the lubricating oil is driven by centrifugal force in the radially outward direction along the inner face of the annular radial member from the inner axially extending member to the outer axially extending member.

2. The oil slinger system according to claim 1, wherein the inner axially extending member comprises a lower oil passage configured to receive the lubricating oil, wherein the lubricating oil passes from the lower oil passage and through the inner axially extending member to the inner face of the annular radial member.

3. The oil slinger system according to claim 1, wherein the outer axially extending member of the seal runner defines a radially outward surface configured to interface with a seal assembly, wherein the heat shield terminates radially inward of the radially outward surface of the outer axially extending member of the seal runner.

4. The oil slinger system according to claim 1, wherein the volume is hermetically sealed from adjacent regions.

5. The oil slinger system according to claim 1, wherein the second angle is between about 75 degrees and about 90 degrees.

6. The oil slinger system according to claim 1, wherein the second angle is 90 degrees.

7. The oil slinger system according to claim 1, wherein the ratio (L/R) of the axial length to the radius is 1.

8. The oil slinger system according to claim 1, wherein the length (L) of the outer axially extending member is greater than an axial length (I) of the inner axially extending member.

9. A cooling system comprising:
   a cooling liquid; and
   the oil slinger system according to claim 1.

10. The oil slinger system according to claim 1, wherein the inner face of the annular radial member comprises at least one of a groove extending in a radial direction and a rib extending in a radial direction.

11. The oil slinger system according to claim 1, wherein the seal runner comprises at least one of steel, titanium, and alloys thereof.

12. The oil slinger system according to claim 1, wherein a distance (D) between the heat shield and the annular radial member of the seal runner is such that a ratio (D/R) of the distance to the radius is between about 0.02 and about 0.20.

13. The oil slinger system according to claim 12, wherein the ratio (D/R) of the distance to the radius is between about 0.05 and 0.08.

14. A method of assembling an oil slinger system comprising:
   disposing a heat shield in mechanical communication with a seal runner, wherein the seal runner comprises an annular radial member having a radius (R) and an outer axially extending member having an axial length (L) such that a ratio (L/R) is between 0.8 and 1.4, the annular radial member disposed at a first angle with respect to the outer axially extending member;
   pressing the seal runner axially onto a shaft; and
   forming a volume bounded by an outer face of the annular radial member and an inner face of the heat shield.

15. The method of claim 14 wherein the seal runner further comprises an inner axially extending member, the inner axially extending member disposed at a second angle with respect to the annular radial member, wherein the inner axially extending member comprises
   a lower oil passage configured to receive a lubricating oil; and
   a radial oil passage configured to permit the lubricating oil to pass from the lower oil passage and through the inner axially extending member to an inner face of the annular radial member.

16. The method of claim 14, further comprising disposing the shaft in mechanical communication with a turbine.

17. The method of claim 15, wherein the second angle is between about 75 degrees and about 90 degrees.

18. A method of radial convective cooling comprising:
   pumping a cooling liquid through an oil slinger system; and
   convectively cooling the oil slinger, wherein the oil slinger comprises
   a seal runner comprising an annular radial member having a radius (R) and an outer axially extending member having an axial length (L) such that a ratio (L/R) is between 0.8 and 1.4, the annular radial member disposed at a first angle with respect to the outer axially extending member;
   a heat shield in mechanical communication with the seal runner; and
   a volume bounded by an outer face of the annular radial member and an inner face of the heat shield.

19. The method of claim 18, wherein the seal runner further comprises an inner axially extending member, the inner axially extending member disposed at a second angle with respect to the annular radial member, wherein the inner axially extending member comprises
   a lower oil passage configured to receive a lubricating oil; and
   a radial oil passage configured to permit the lubricating oil to pass from the lower oil passage and through the inner axially extending member to an inner face of the annular radial member.

* * * * *